Oct. 7, 1941.  F. O. GRAHAM  2,258,450
FLOAT VALVE
Filed Aug. 2, 1940
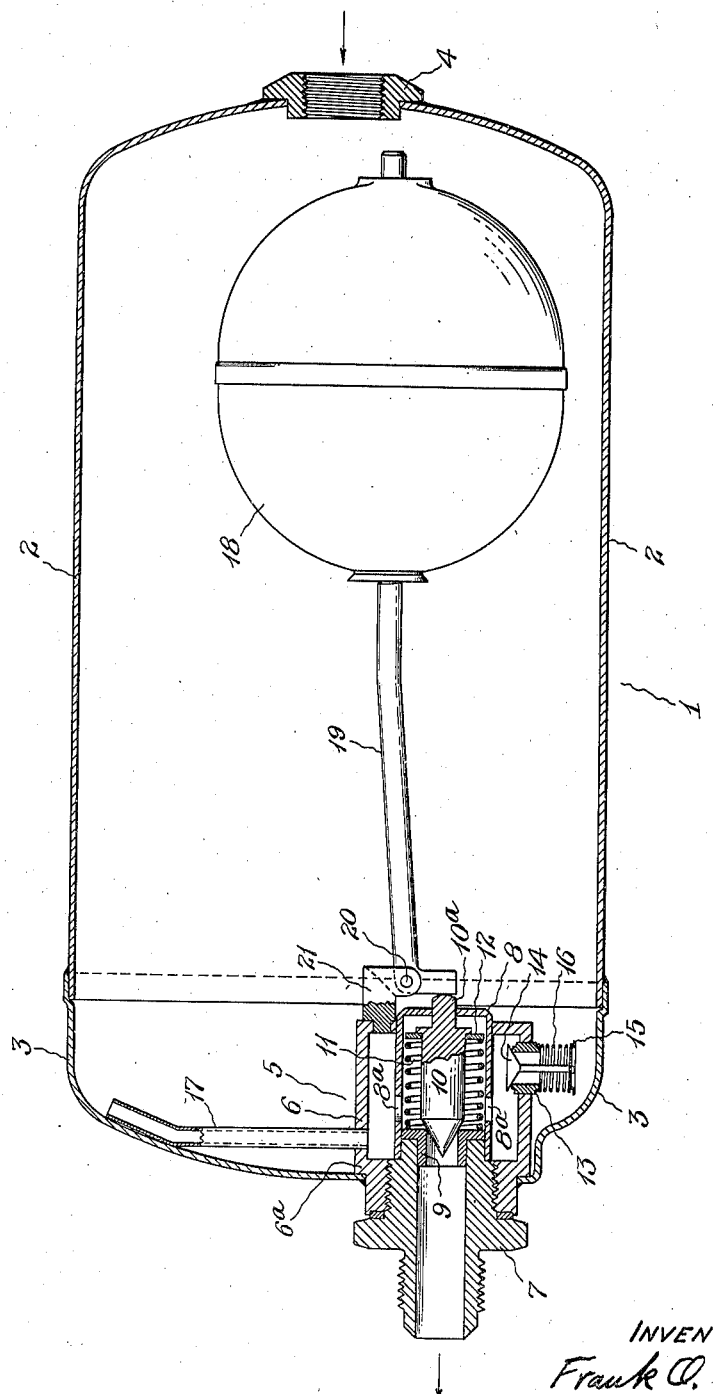
INVENTOR:
Frank O. Graham
BY Ray S. Gehr
ATTORNEY Patented Oct. 7, 1941

2,258,450

UNITED STATES PATENT OFFICE 2,258,450

FLOAT VALVE

Frank O. Graham, Detroit, Mich., assignor to Temprite Products Corporation, Detroit, Mich., a corporation of Michigan Application August 2, 1940, Serial No. 350,026

3 Claims. (Cl. 62—127)

This invention relates to float valves and more particularly to the so-called high-side float valves utilized in mechanical refrigeration systems.

The use of the high-side float valve in refrigeration systems has been subject to the drawback that the presence of uncondensed vapor, air or other uncondensable gas in the system tends to accumulate in the float chamber of the valve and, as such accumulation proceeds, the valve finally becomes gas locked and fails to operate. This problem has been especially troublesome in connection with high-side float valves of large capacity. Various expedients have been proposed to overcome the difficulty but most of these proposals have been open to the objection of complication and undue cost or interference with other parts of the refrigeration system.

Accordingly the general object of the present invention is the provision of a form of construction for high-side float valves which obviates the above mentioned difficulties, which is relatively simple and reliable in operation and which is well adapted for use in high-side float valves of large capacity.

A further object of the invention is the provision of a high-side float valve having the characteristics last referred to and which can readily be fabricated and during use can readily be disassembled to the necessary extent for inspection and servicing.

Other objects more or less incidental or ancillary to those above stated will appear from the description which follows.

The invention consists in certain features of construction and combinations of parts as hereinafter set forth in connection with the accompanying drawing of a preferred form of construction and as defined in the appended claims.

The drawing shows a vertical axial section through a high-side float valve embodying the invention.

Referring in detail to the construction illustrated, the casing structure of the valve comprises a cylindrical shell designated as an entirety by the numeral 1 and having a main member 2 and a second member 3 hermetically connected to the member 2. The shell member 2 is apertured to receive a threaded inlet fitting 4 and the shell member 3 is apertured to receive a valve casing structure designated as an entirety by 5.

The structure 5 comprises a cylindrical casing member 6 which projects through the aperture in the shell member 3, being formed with a shoulder 6a to engage the inner side of the shell wall. The member 6 is soldered or otherwise hermetically joined to the shell member 3. The member 6 has circular openings in its opposite ends, one of these openings being internally threaded to receive a flanged coupling member 7 and the other of said openings being arranged to closely fit a valve cage member 8 which is secured (as by soldering) to the coupling member 7. Free communication through the side wall of cage 8 is provided by a series of openings 8a. The coupling member 7 is fitted with a valve seat member 9 which also is secured to member 7 with a pressed fit. Within the cage 8 is a needle valve 10 arranged to engage the seat 9 and having a stem 10a which has a nice sliding fit in the end wall of the cage 8. A helical spring 11 surrounds valve 10 having one of its ends engaging the seat member 9 and its other end engaging a ring 12 that abuts against a flange on the valve 10.

At its lower side the casing member 6 is formed with an opening fitted with a sleeve 13 upon the upper end of which is seated a light weight valve 14, the stem of which has its lower end provided with a disk 15 to serve as an abutment for the lower end of a relatively weak spring 16, the upper end of which engages the end of sleeve 13. At its upper side the casing member 6 has an aperture in which is hermetically fitted the lower end of an open-ended tube 17 which extends upward and has its open upper end disposed near the top of the chamber formed by the shell 1.

The shell 1 forms a chamber for a float 18 which has a bent rod 19 pivotally mounted at 20 on a bracket 21 which is secured in the end wall of casing member 6 with the depending end of the rod 19 disposed to engage loosely the adjacent end of the valve stem 10a.

In the use of the valve as a part of a closed circuit refrigeration system, a liquid refrigerant line leading from a suitable refrigerant compressor and condenser is connected with the inlet fitting 4 of the casing and a suitable conduit leading to the evaporator of the closed system is connected with the fitting 7 of the valve, the evaporator in turn being connected with a suction line leading to the suction side of the refrigerant compressor. All of the mentioned parts of the refrigeration system are well known and therefore have not been illustrated in the drawing.

With the float chamber of the valve casing empty, the weight of the float is applied to the end of the valve stem 10a and tends to press the valve 10 against its seat in opposition to the pressure of the spring 11. This spring is made strong enough to unseat the valve against the maximum head pressure of the refrigerant when the valve is relieved from the weight of the float. As liquid refrigerant enters the float chamber the level of the liquid gradually rises and lifts the float so that the valve 10 is relieved from the weight of the float and spring 11 acts to open the valve 10, thus opening the interior of the casing member 6 to the low pressure side of the refrigeration system. Thereupon, liquid refrigerant under high pressure will flow from the lower portion of the float chamber past the lightly spring-loaded valve 14 into the interior of casing 6, through cage openings 8a and then through valve seat 9 into the low pressure side of the refrigeration system. Valve 14 offers a small resistance to the flow of liquid refrigerant and causes to exist within the casing 6 a pressure slightly lower than the pressure within the float chamber. This lower pressure, acting through the tube 17, draws vapor and uncondensable gases from the vapor space in the upper part of the float chamber down into the casing 6 and out past the valve 10 and through the outlet passage of fitting 7.

In this manner, during the time the main valve 10 is open, any excess vapor, air or other uncondensed gas which may have accumulated above the liquid level in the float chamber is drawn off into the low pressure side of the refrigeration system and vapor or gas locking of the float valve is effectively prevented. Since this withdrawal of vapor or gas from the high side to the low side of the refrigeration system occurs only when the main valve 10 is open, it will be seen that there is no loss of refrigerant vapor from the high side to the low side of the system during idle periods of the refrigerant compressor and corresponding lowering of efficiency.

As far as the broader aspects of the invention are concerned, the main valve can be constructed and arranged in various modified ways, but the arrangement of the valve to open against the flow under the pressure of a spring and to close under the weight of the float, permits a loose connection between the float rod and the valve and thus makes it possible to construct the coupling 7, cage 8, seat 9, valve 10, spring 11 and washer 12 as a unit which is adapted to be readily inserted and withdrawn from the valve casing structure 6, either for purposes of inspection or repairs.

It will be observed that the passages through the valve seats 9 and 13 are of large capacity so that the device is well adapted to handle a large volume of liquid.

While a preferred form of construction has been shown and described, it will be understood that the construction and arrangement of the parts can be varied widely without departing from the invention as defined in the appended claims.

What I claim is:

1. In a float valve assembly, the combination of a casing structure forming a float chamber with a fluid inlet passage and a valve chamber with a fluid outlet passage and having a passage establishing communication between said chambers; a main valve controlling flow through said outlet passage; means, comprising a float in the float chamber, for opening said valve when the liquid level in the float chamber rises and for closing said valve when said level falls; a valve for restricting the flow of liquid from the float chamber to the valve chamber through the said passage between said chambers, said valve being arranged to open with the flow but being biased against such opening; and means establishing communication between the valve chamber and the upper part of the float chamber above the maximum liquid level therein; whereby, upon the opening of the main valve, suction in the said outlet passage effects a discharge of gas from the upper part of the float chamber through the said outlet passage.

2. The combination as claimed in claim 1 in which the main valve is arranged to close in the direction of flow through the outlet passage and in which the means for opening and closing the main valve comprises a spring tending to open the valve and a connection between the valve and the float arranged to close the valve against the tension of the said spring when the float falls with the liquid level in the float chamber and to permit the opening of the valve by the spring when the float rises with the liquid level in the float chamber.

3. The combination as claimed in claim 1 in which the casing comprises a plural-part shell forming the float chamber and having an opening for the inlet of liquid and a valve casing mounted in a second opening in the shell and comprising a unitary structure forming a valve seat and a cage surrounding and guiding the main valve, the said unitary structure with the main valve mounted therein being removable as a unit from the remainder of the casing structure.

FRANK O. GRAHAM.